Feb. 16, 1926.
S. BARDY
1,573,438
METHOD OF PROJECTING MOVING PICTURES AND MOVING PICTURE PROJECTING MACHINES
Filed March 8, 1921        6 Sheets-Sheet 1
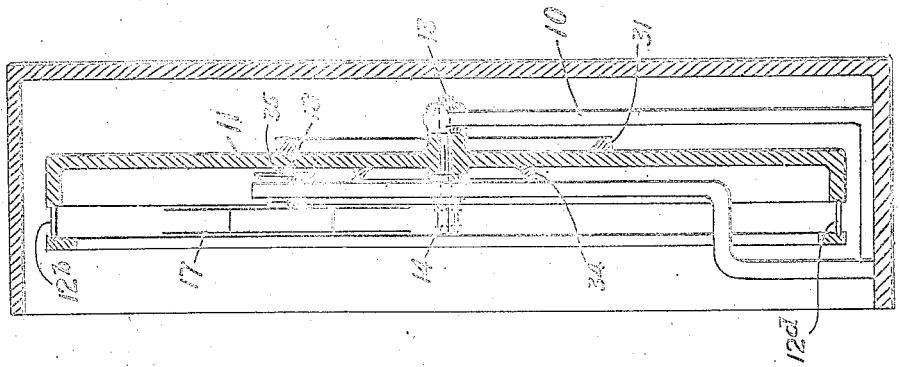
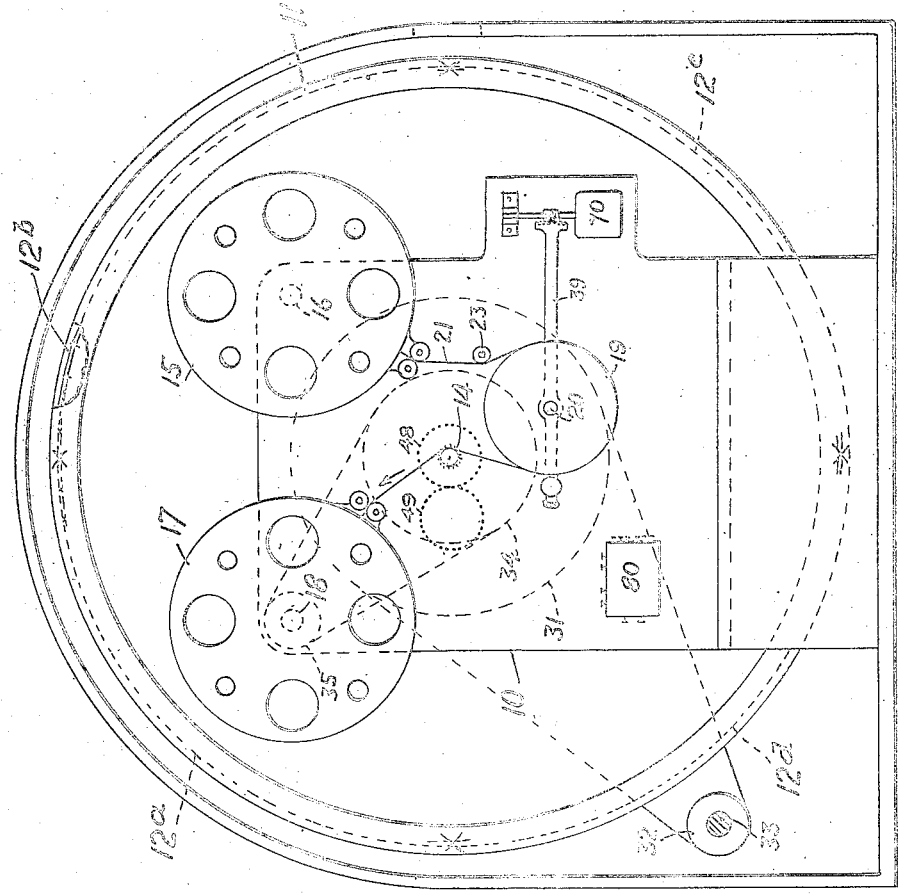
INVENTOR.
Samuel Bardy
BY Frank S. Busser
ATTORNEY.
WITNESS:

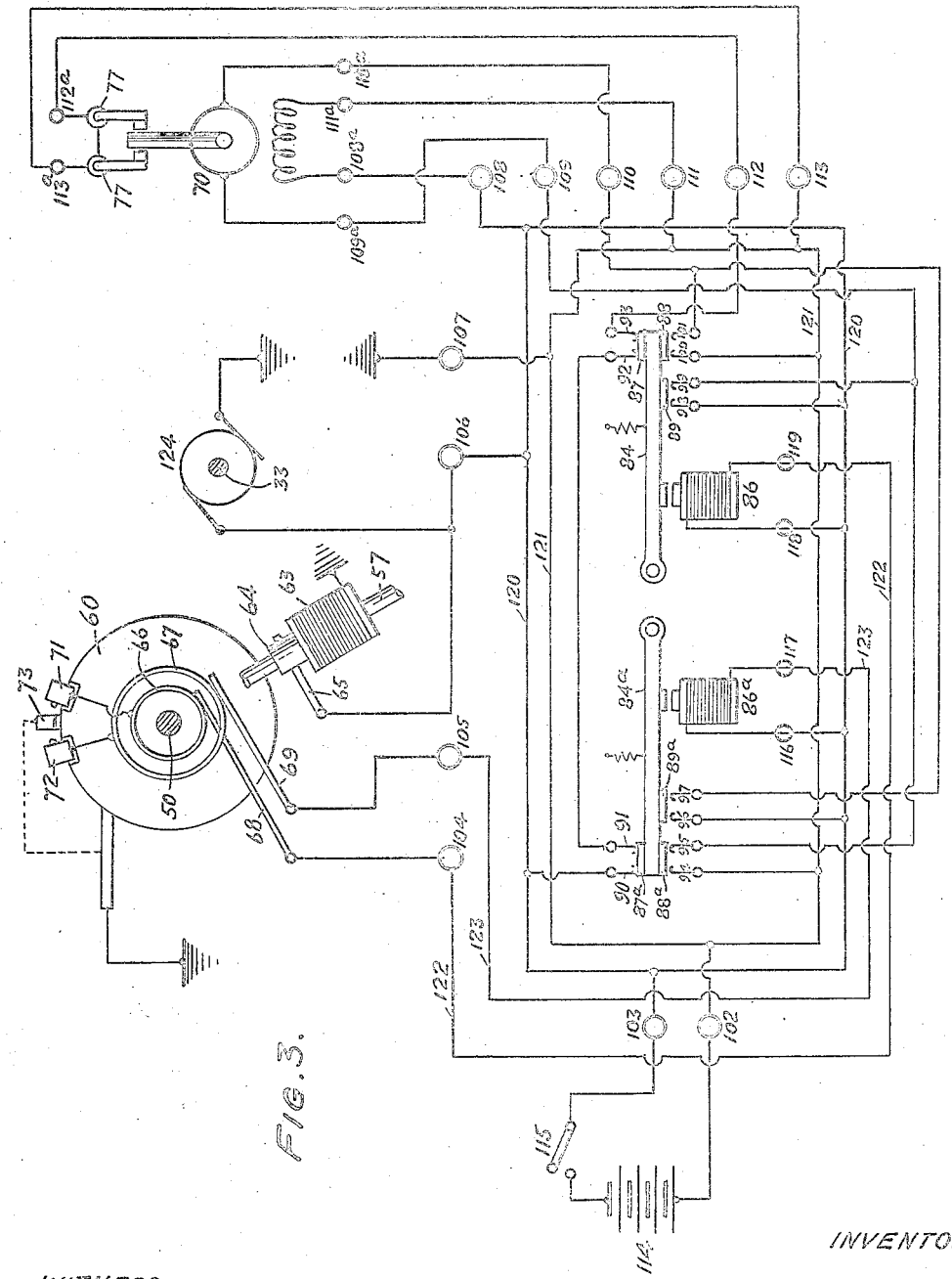

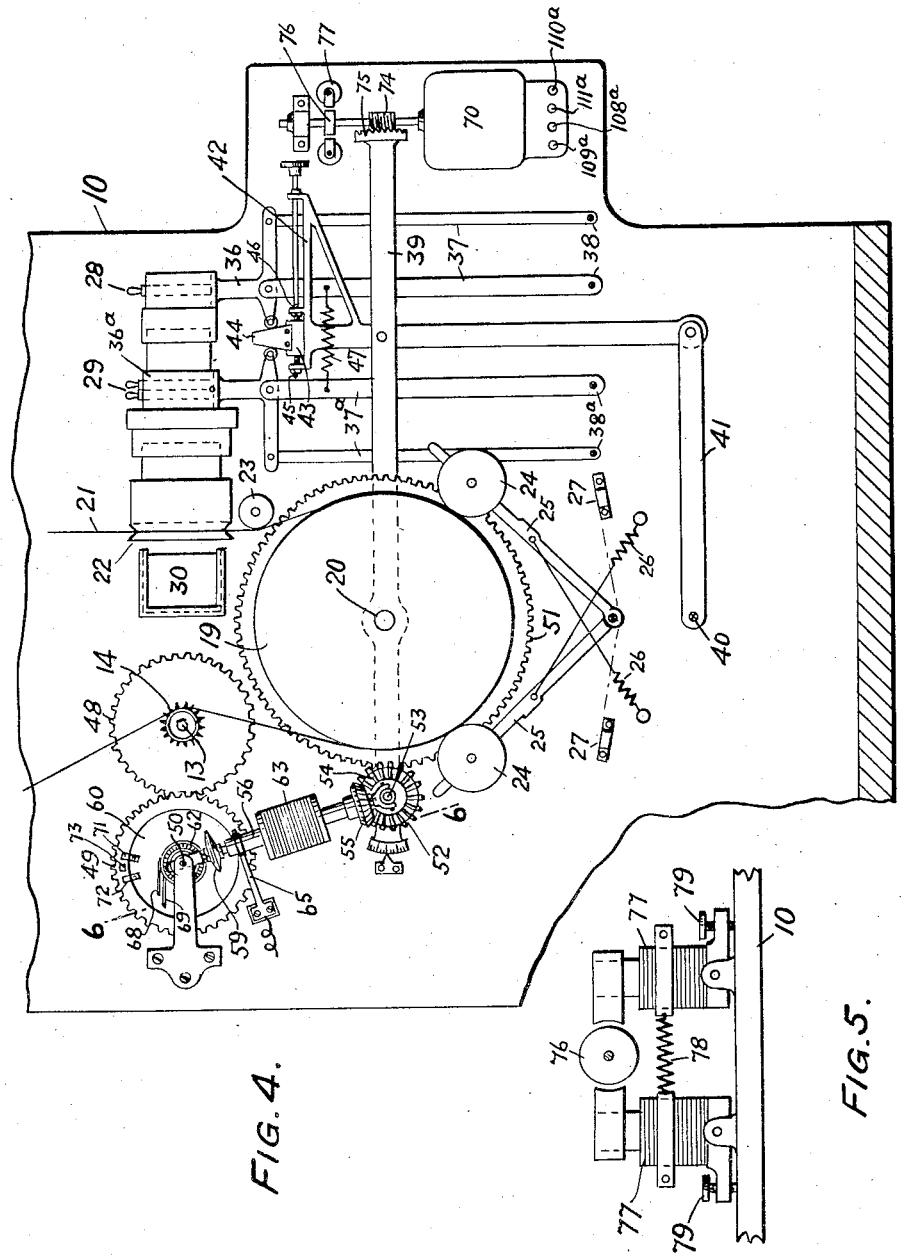

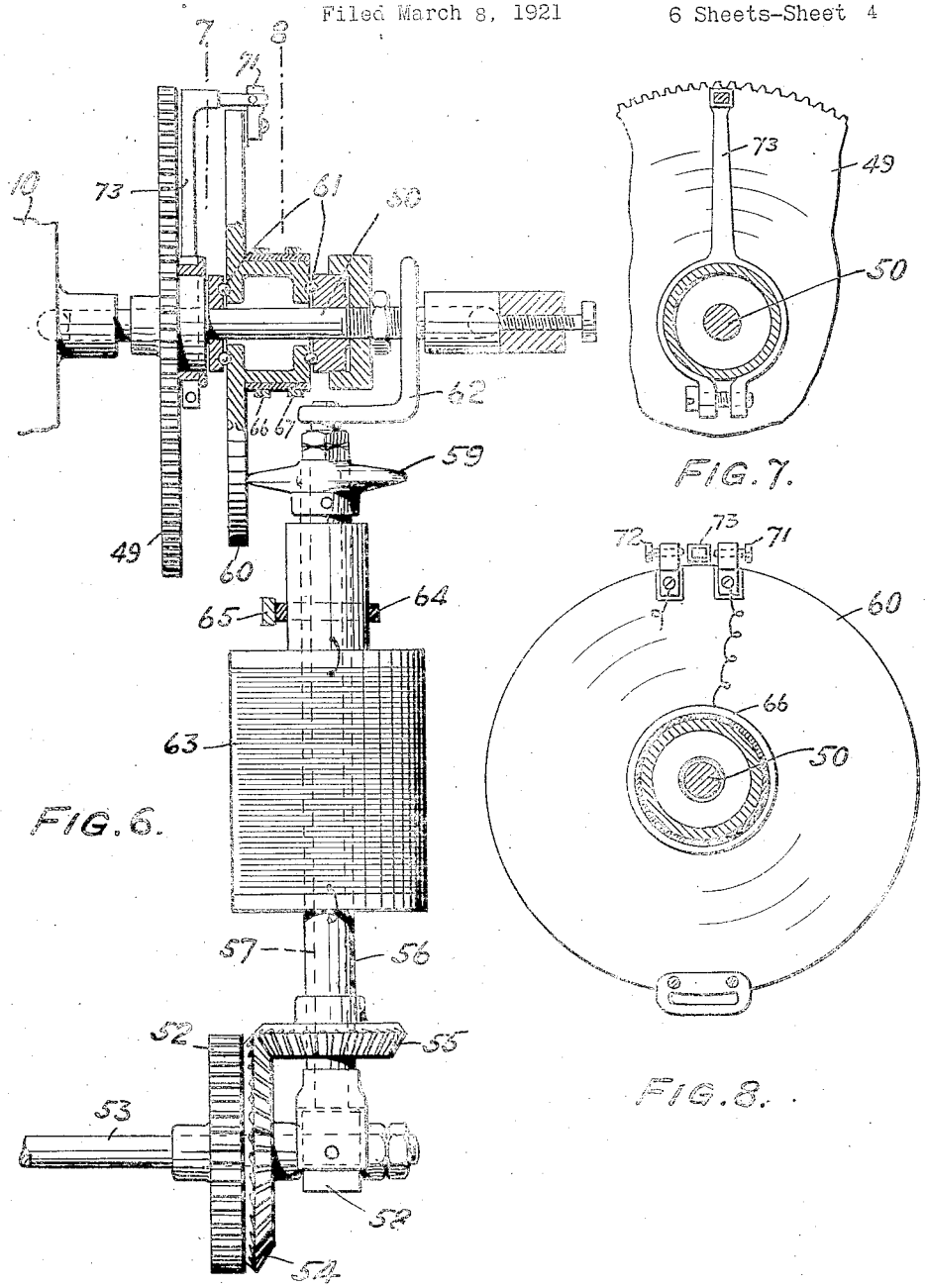

Feb. 16, 1926.  1,573,438
S. BARDY
METHOD OF PROJECTING MOVING PICTURES AND MOVING PICTURE PROJECTING MACHINES
Filed March 8, 1921  6 Sheets-Sheet 5

WITNESS:

INVENTOR
Samuel Bardy
BY
ATTORNEY.

Feb. 16, 1926.
S. BARDY
1,573,438
METHOD OF PROJECTING MOVING PICTURES AND MOVING PICTURE PROJECTING MACHINES
Filed March 8, 1921 6 Sheets-Sheet 6
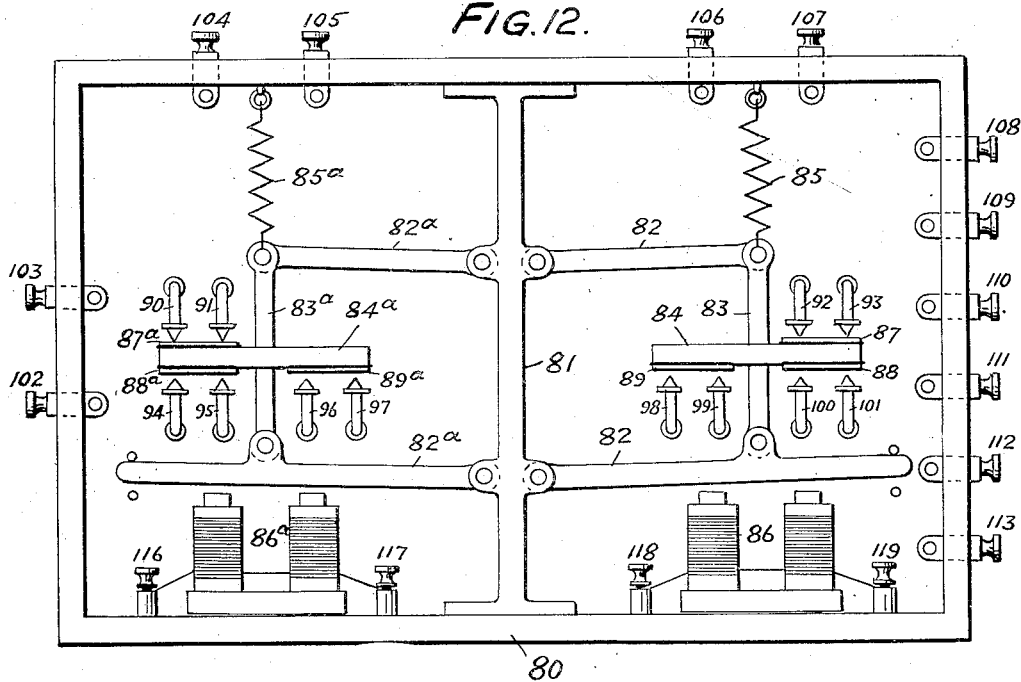
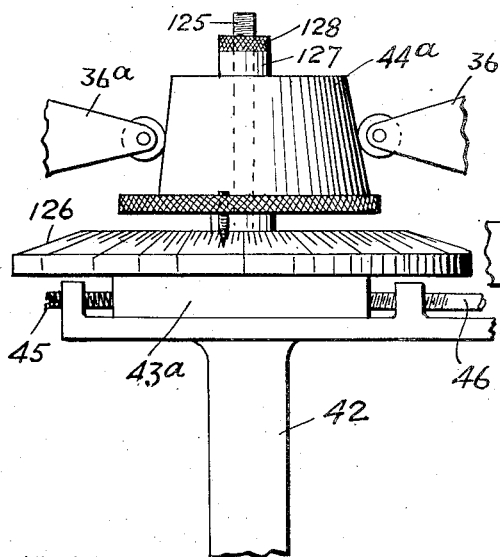
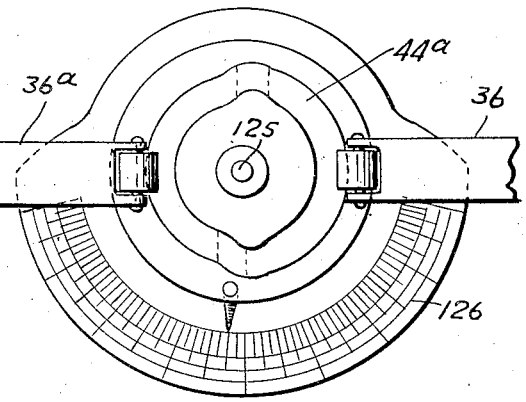
WITNESS:
INVENTOR
Samuel Bardy
BY
ATTORNEY.

Patented Feb. 16, 1926.

1,573,438

UNITED STATES PATENT OFFICE.

SAMUEL BARDY, OF PHILADELPHIA, PENNSYLVANIA, ASSIGNOR, BY MESNE ASSIGNMENTS, TO BARDY PROJECTOR CO., OF PHILADELPHIA, PENNSYLVANIA, A CORPORATION OF DELAWARE.

METHOD OF PROJECTING MOVING PICTURES AND MOVING-PICTURE-PROJECTING MACHINES.

Application filed March 8, 1921. Serial No. 450,575.

*To all whom it may concern:*

Be it known that I, SAMUEL BARDY, a citizen of the United States, residing at Philadelphia, county of Philadelphia, and State of Pennsylvania, have invented a new and useful Improvement in Methods of Projecting Moving Pictures and Moving-Picture-Projecting Machines, of which the following is a full, clear, and exact description, reference being had to the accompanying drawings, which form a part of this specification.

This invention relates to an improvement in the method of projecting moving pictures and moving picture projecting machines, in which the film strip is continuously moved and the object is projected to appear stationary on the screen by means of an optical compensating system which tends to move the picture on the screen in the reverse direction to the movement of the image, and at the same speed, so that the picture projected on the screen appears to be stationary to the eye of the observer.

It is generally known to those skilled in the moving picture art that films have a tendency to continually and gradually shrink to an unknown limit, which is at first relatively rapid and decreases as the film ages and dries out. The rate and speed of said shrinkage varies in accordance with the temperature and atmospheric condition to which the film is exposed, as well as to differences in the film structure. This shrinking of films has long been recognized, and as it is essential to maintain perfect synchronism between the successive pictures on the film and the projecting apparatus, it has now become customary to thoroughly age the film before perforating, so that the further shrinkage thereof will not be sufficient in length or variation to cause the teeth on the film feeding sprocket wheels getting out of timed relation with the successive pictures on the film.

This aging of the films before perforating has no doubt overcome to a large extent the evil of the feeding sprocket wheels getting out of synchronism with the successive pictures, so that the further slight shrinkage of the film, which does not now generally exceed one-quarter of an inch to the foot, will not appreciably affect the appearance of the projected picture, when the pictures are projected through a machine in which the film is intermittently moved between exposures and is maintained stationary when exposed. The only optical defect which would be caused by the shrinking of the film when projected through an intermittent machine is the slight increasing and decreasing in the size of the picture on the screen, and as this variation is generally relatively gradual throughout the film, and not abrupt, the increasing and decreasing of the size of the picture on the screen is also relatively gradual, so that the usual observer would hardly detect any optical defect provided, however, that the shrinkage were not sufficient to cause the film and sprocket wheels to get out of synchronism.

This, however, is not the case when the films are projected through machines in which the film is continuously moved to expose a given number of pictures per second and in which a moving optical system is used to compensate for the movement of the film.

In machines of this kind, it is also necessary to maintain synchronism between the film feeding sprocket wheels and the successive pictures on the film as the optical compensating system is actuated in timed relation to the feeding sprockets. Machines of this type have an optical system to compensate for the movement of the film which will not interfere with the aplanatic and astigmatic properties of the relatively fixed rectilinear projection lens. A device such as described in my Patent No. 1,316,669, issued September 23, 1919, would be ideal if the ratio between the number of pictures and the length of the film were the same throughout the length of the individual films, as the speed of compensating lens and the lineal speed of the film would then always be constant. It is well known to those skilled in the manufacture and projection of film that the ratio between the number of pictures and lineal length of film is not constant throughout the length of the film, and in order to project a picture through a machine of this type to prevent flickering, due to variation in the sizes of the pictures on the film, it is essential to provide some means to automatically compensate for this variation in size.

The object of this invention is to provide a method and an automatic synchronizing device which will increase and decrease the enlargement of the picture conversely in proportion to the variation in the sizes of the pictures on the film caused by the length of the film, so as to maintain the size of the picture projected through or onto the optical compensating means constant and thus correct optically the variations in the film shrinkage.

I accomplish this object by utilizing the variations in speed between the lineal travel of the film and the number of pictures passing a given point in a given time and provide suitable devices actuated by said variations to adjust the film, projecting lens, and movable optical compensating system with relation to each other in accordance with such variations.

In my method and apparatus, the compensating device is moved at a constant lineal speed and the successive pictures on the film are moved in timed relation to the compensating device so that it is adapted to counteract the movement of the film at the proportionate lineal speed. If the pictures on the film could be maintained at a predetermined size, the projected picture on the screen would be stationary, as the lineal movement of the pictures and compensating device would be constant. If the film shrinks slightly, the lineal travel of the film will be slower proportionately than the compensating device, so that the successive pictures projected onto the screen will be moved on the screen in proportion to the differences between the lineal speed of a standard or normal film and the shrunk film, which causes flicker.

The successive pictures on the film are moved in timed relation to the compensating device, so that for each picture passed between the source of light and the automatically adjustable projecting device there is moved therewith a compensating surface or lens to counteract the movement of the film. The projecting lens is automatically adjusted by devices actuated by the differences between the height of the pictures or length of film in proportion to the number of pictures caused by the shrinkage, to vary the magnification of the pictures in accordance with the variation in height, to maintain the area of light rays passing through the pictures constant at the plane at which they are intercepted by the compensating surfaces or lenses, so that the light rays passing through the successive pictures are always in synchronism with the successive compensating surfaces or lenses.

Another object of my invention is to provide a combined synchronizer and stabilizer which will maintain the lineal speed of the film substantially constant, irrespective of slight variations in the film length caused by shrinkage, which will assist in avoiding flicker as well as prevent excessive wear on the edges of the perforations in the film by the teeth on the sprocket wheels.

A still further object of my invention is to provide a sensitive controlling device for the synchronizing mechanism for the variations in the length of the film which is automatic in its action, which will readily and quickly respond to the variations in length, and readily and quickly cause the synchronizing mechanism to be set into operation to adjust the necessary elements of the apparatus to compensate for the variations in that portion of the film passing through the apparatus, as such variations in length occur.

Fig. 1 is a diagram illustrating the general arrangement of an apparatus built in accordance with one form of my invention.

Fig. 2 is a side view of same, principally in section.

Fig. 3 is a diagram illustrating the various electrical connections.

Fig. 4 is a face view of the synchronizing mechanism.

Fig. 5 is a sectional plan view illustrating the braking device for the synchronizing motor.

Fig. 6 is a detail sectional view on the line 6—6 of Fig. 4.

Figs. 7 and 8 are cross-sectional views on the lines 7 and 8 of Fig. 6.

Figure 9:
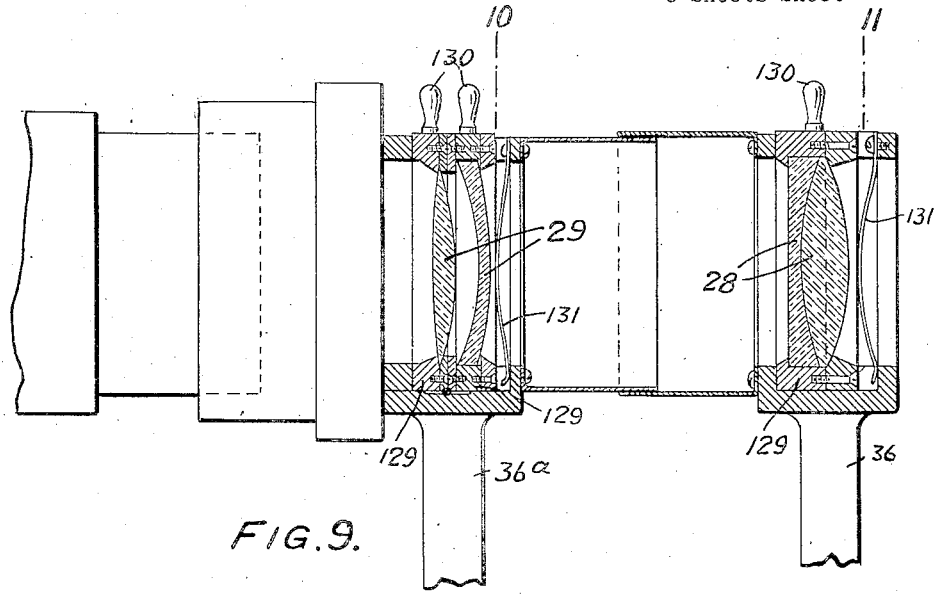

Fig. 9 is a longitudinal sectional view through the adjustable projecting lens system.

Figures 10, 11:
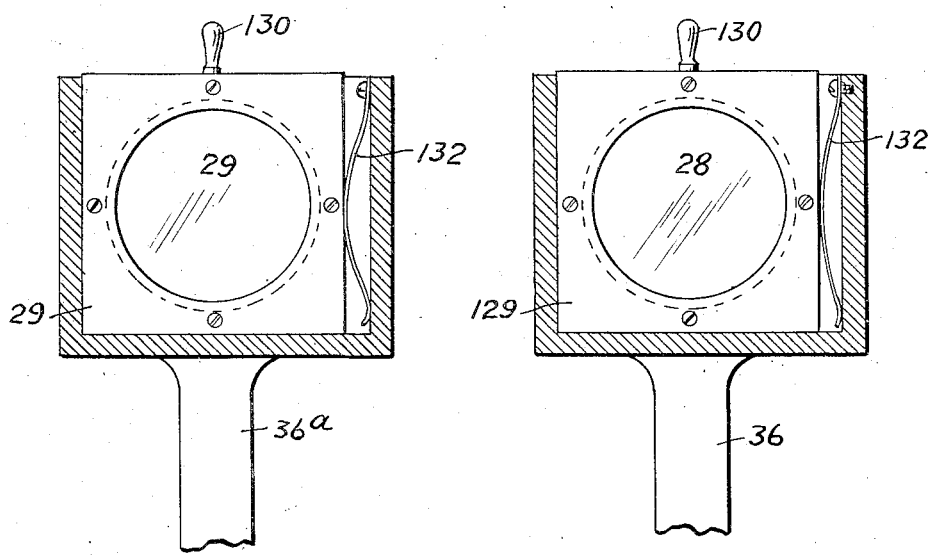

Figs. 10 and 11 are detail sectional views on the lines 10 and 11 respectively of Fig. 9.

Fig. 12 is a view of the automatic switch box with the cover removed.

Fig. 13 is a side elevation of an adjustable cam for controlling the positions of the projecting lens members.

Fig. 14 is a plan view of same.

In these drawings, the reference character 10 designates a suitable supporting frame on which is rotatably mounted a drum 11 carrying four movable lenses $12^a$, $12^b$, $12^c$, and $12^d$, each of which in the construction shown is divided into a plurality of sections, and which are mounted for adjustment relative to each other so that the different sections will project the light rays to the same point on the screen.

The lens drum 11 is rotatably mounted about the axis of a shaft 13 carrying a film feed sprocket wheel 14 which is provided with the proper number of teeth for feeding four pictures for each revolution or one picture for each of the four compensating lenses on the drum 11.

The drum 11, shaft 13 and the sprocket wheel 14 are connected to each other by means of the usual framing mechanism so that the sprocket wheel and drum can be adjusted relative to each other to center the pictures with relation to the lenses 12ᵃ to 12ᵏ.

15 is the film feeding reel mounted on a spindle 16 which is provided with the usual friction devices for preventing the overrunning of the reel, and 17 is the film take-up reel mounted on the spindle 18. 19 is a film measuring wheel or synchronizer which is arranged to freely rotate on a spindle 20 supported from the frame 10, and which wheel forms one of the elements of the compensating device.

The film 21 passes from the reel 15 through a film gate 22 of common construction, about an idler 23, the measuring wheel 19 and the sprocket wheel 14 to the take-up reel 17.

24 are pressure rollers which are mounted on levers 25 pivotally connected to the frame 10, and which rollers are held against the film on the measuring wheel 19 by means of springs 26 to prevent slip between the film and the measuring wheel.

The connections between the levers 25 and springs 26 are such that when the levers are in the positions shown in Fig. 3 the rollers 24 will be pressed against the film and wheel 19, and when the levers 25 are depressed the springs 26 will retain the levers against the stops 27 on the frame to permit the removal or positioning of the film.

Interposed between the film gate and the movable or compensating lenses on the drum 11 is the projecting lens which comprises lenses 28 and 29.

These lenses 28 and 29 are mounted on suitable supports to permit adjustment toward and from the film to focus the picture on the screen and are also arranged to be adjusted relative to each other to compensate for the variations in the sizes of the pictures on the film to maintain the projected picture a uniform size to prevent flicker, and are adjusted by mechanism hereinafter more clearly set forth.

As illustrated diagrammatically in Figs. 1 and 4, the light rays from a suitably located lamp are directed through that portion of the film 21 within the film gate 24, the projecting lens and the rectifying lenses 12ᵃ to 12ᵈ to the screen by a suitable prism 30 suitably supported on the frame 10. The drum 11 and the sprocket wheel 14 are connected so as to be rotated together by means of a driving pulley 31 connected to the drum 11, which is connected by means of a belt with a pulley 32 on a motor shaft 33. 34 is a second pulley on the drum 11 which is connected with a pulley 35 on the spindle 18 of the take-up reel 17 and which is arranged to frictionally drive the reel 17 to draw and wind up the film at the speed of the sprocket wheel 14, which is rotated at the proper speed by means of the connections to the motor shaft.

The standard films of today are perforated along their longitudinal edges to provide four holes along each edge for each picture, and sixteen such sets or pictures for each foot of film when first perforated. As the films are now generally thoroughly dried and aged before they are perforated, there is very little likelihood of a film shrinking to an extent greater than one-quarter inch per foot. Or, in other words, there is no danger of a film shrinking to such an extent that the length of sixteen pictures is less than eleven and three-quarter inches, and as this is substantially the maximum amount to which the films shrink, I prefer to make the diameter of the sprocket wheel 14 such that it will prefectly mesh with a film which is eleven and three-quarter inches per sixteen pictures, or having a circumference of 2.9375 inches, so that the normal length of four pictures on the film is substantially greater than the circumference of the sprocket wheel.

In a film which has just been perforated, which is exactly twelve inches in length for each sixteen pictures, while the lineal travel of the periphery of the sprocket wheel is only eleven and three-quarter inches per sixteen pictures, there would be a slip of about .039 inch for each tooth of the sprocket wheel; or, in other words, as one tooth of the sprocket wheel disengages itself from the opening in the film, the next hole in the film is advanced .039 inch with relation to the tooth before the tooth engages the edge of the next perforation.

As the perforations in the film are somewhat larger than the sprocket teeth, I prefer to make the circumference of the sprocket wheel about equal to the length of four pictures at maximum shrinkage, so there is no danger of the sprocket teeth becoming disengaged from the perforations in the film, which might occur if the circumference of the sprocket wheel was three inches and a film shrunk one-fourth inch per foot were fed thereby, as the sprocket teeth would then have a tendency to engage the film beyond the perforations.

When operating under the conditions above described, I prefer to frictionally drive the take-up reel 17 to such an extent that there will be a little more than sufficient pull on the film to draw the film from feeding reel 15 so that only a very slight pull of the film is exerted on the sprocket wheel 14, so that said wheel merely acts as a registering wheel for the successive pictures which will reduce the wear on the perforations to a negligible point. By so arranging the film feeding mechanism that the sprocket wheel tends to move slower than the film, I avoid any danger of the film overrunning the sprocket wheel.

A full reel 15 is placed on the spindle 16 and the end of the film is connected to the reel 16 after the film has been passed through the gate 22, around idler 23, measuring wheel 19 and sprocket wheel 14. The take-up reel 17 is then rotated by hand to take up all of the slack in the film, and the levers 25 are then shifted into the position shown in Fig. 4 to retain the film in driving contact with the measuring and synchronizing wheel 19. The motor connected to the shaft 33 is then set in motion to drive the various parts and to rotate the sprocket wheel 14 at the proper speed to pass a predetermined number of pictures, say sixteen pictures per second, through the gate 22 and if the film is a newly perforated film, having exactly sixteen pictures to each foot of film throughout the entire length thereof, the lineal speed of the wheel 19 will be exactly one foot per second, and under which conditions a perfect picture, without flicker, would be projected on the screen.

As these conditions are not normal due to the shrinkage of the film, I have provided means for automatically adjusting the lenses 28 and 29 relative to each other and the film in accordance with the film shrinkage or the sizes of the picture to maintain the projected picture the same size on the screen throughout the length of the film, regardless of the shrinkage. I accomplish this in the preferred form of my apparatus by mounting the lenses 28 and 29 on movable supports which are to be arranged to be moved by synchronizing mechanism controlled by the variation in speed between the measuring wheel 19 whose lineal travel per minute is equal to the length of film passed through the film gate per minute and the speed of the sprocket wheel 14, which constantly rotates at the rate of 240 revolutions per minute. The mechanism is so arranged that when the measuring wheel 19 slows up with relation to the sprocket wheel 14 due to one portion of the film being shrunk, the lenses 28 and 29 will be adjusted to increase the magnifying power of the lenses 28 and 29 in the proper proportion to the shrinkage, and if any of the following portions of the film should have pictures of a slightly greater length than those just mentioned, the wheel 19 would speed up in proportion to the increased length of film and again adjust the lenses 28 and 29 to reduce the magnifying power of the projecting lens in the proper proportion, so as to maintain a given size of picture on the screen regardless of variations in the sizes of the pictures on the film within predetermined limits.

In Fig. 4, I have shown my preferred form of compensating mechanism in which the lens 28 is supported in a carrier 36 which is pivotally mounted on a pair of parallel levers 37 which are pivotally connected to the frame 10 at 38. The lens 29 which I have shown formed of two members is also supported in a carrier 36$^a$ which is similarly supported by parallel levers 37$^a$ pivotally connected to the frame 10 at 38$^a$.

These lens carriers are arranged to telescopically engage each other, while the carrier 36$^a$ is also arranged to telescopically engage a tubular extension from the film gate 22.

Pivotally mounted on the spindle 20 of the measuring wheel 19 is a walking beam 39, and pivotally mounted on frame 10 below said spindle at 40 is a lever 41. 42 is a cam supporting frame which is pivotally connected to the walking beam 39 and the lever 41 in such a manner that when the walking beam is rocked the frame 42 will be raised and lowered without varying the angle thereof.

Adjustably mounted on a suitable seating surface on the supporting frame 42 is a cam block 43 having a double-faced cam 44 connected thereto, and which is adjustably held in position on the supporting frame 42 by means of adjusting screws 45 and 46.

The opposite faces of the cam are engaged by rollers on the lens carriers 36 and 36$^a$, and which rollers are held in contact with the cam faces by means of a spring 47 connected to the adjacent parallel bars 37 and 37$^a$.

The surfaces of the cam 44 engaged by the rollers are properly shaped to move the lenses 28 and 29 toward and from each other to increase and decrease the magnifying power of the projecting lens in accordance with the variations in the sizes of the pictures on the film. The adjusting screws 45 and 46 are arranged to adjust the cam with relation to the lens carriers, when first setting up the machine, and are not afterward adjusted except under extraordinary conditions, as I have provided means for readily removing the lenses for cleansing without affecting the adjustment of the lenses.

Connected to the sprocket shaft 13 and arranged to rotate therewith is a gear wheel 48 which meshes with a gear wheel 49 on a shaft 50 mounted in bearings on the frame 10.

51 is a gear wheel on the measuring wheel 19 which meshes with a pinion 52 on a stub shaft 53 carried on one end of the walking beam 39. Connected to the pinion 52 is a beveled pinion 54 which meshes with a pinion 55 on a sleeve 56 which is rotatably mounted on a shaft 57. The shaft 57 is carried by means of universal support 58 on the stub shaft 53 for the purpose hereinafter described.

Connected to the upper end of the sleeve 56 and arranged to rotate therewith is a friction driving disk 59 adapted to be held in driving contact with a driven disk 60 rotatably mounted on the shaft 50 and is arranged to be driven by the driving disk 50 through the medium of the measuring wheel 19 and the interposed gearing.

The hub of the driven disk 60 is interposed between ball bearings 61 supported on the shaft 50 to eliminate friction between the shaft 50 and the disk 60 to overcome the tendency of the shaft 50 to drive the disk 60.

Secured to the end of the shaft 57 is a yoke 62 of non-magnetic material which surrounds the shaft 50, which is arranged to maintain the shafts 50, 53, and 57 in alignment with each other and at the same time permit the driving disk 59 to be moved along the face of the driven disk 60 to vary the ratio between said disks when the walking beam 39 is rocked as well as to permit the movement of the driving disk 59 toward and from the driven disk 58 to make and break the driving connections between the disks 59 and 60.

63 is an electro-magnet connected to the sleeve 56 and is arranged to rotate therewith, and 64 is a conducting ring connected to the sleeve 56 but insulated therefrom. The ring 64 is connected to one pole of the winding of the magnet 63, while the other pole thereof is grounded through the sleeve 56 and the other mechanism. Mounted on the frame of the machine is a spring metal conducting bush which is in engagement with the conducting ring 64 and which is connected to a source of electrical energy, and is arranged to conduct the current to the magnet 63 when the circuit is closed. As the disks 59 and 60, sleeve 56, shafts 50, 53 and 57, as well as the frame, are made of magnetic material, the disks 59 and 60 will be held in driving relation to each other by the magnetic flux when the circuit is closed through the magnet 63, and when said circuit is broken the disk 59 will be moved out of driving contact with the disk 60 by the spring brush 65 without breaking the electrical connection between the brush 65 and the conducting ring 64.

66 and 67 are conducting rings on the hub of the driven disk 60 but insulated therefrom, and which rings are in electrical connection with brushes 68 and 69 respectively. These brushes 68 and 69 are connected to the frame of the machine, but insulated therefrom, and are electrically connected to suitable switch mechanism hereinafter described for controlling the circuit to electrically actuated devices, such as a motor 70, for rocking the walking beam 39. Secured to the disk 60, but insulated therefrom, are adjustable contacts 71 and 72 which are electrically connected to the conducting rings 66 and 67, respectively, and which are arranged under certain conditions to close the circuit through a contact finger 73 frictionally carried on the hub of gear wheel 49, and through which it is grounded to complete the circuit through the motor 70. The shaft of the motor 70 is provided with a fine pitch worm 74 which is in engagement with a sector 75 on the walking beam 39 to rock the walking beam when the motor 70 is rotated in either direction to shift the driving disk 59 along the face of the driven disk 60 to change the ratio of the speeds between said disks. 76 is a disk of magnetic material connected to the shaft of the motor 70, and 77 are electro-magnets pivotally connected to the frame of the machine and which are normally held from each other and the disk 76 by means of a spring 78. The adjacent faces of the cores of the magnets 77 are curved at one end to form brake shoes for engaging the disk 76 to instantaneously arrest the movement of motor shaft and clamp it against movement when the magnets 77 are energized. The magnets 77 are provided with adjustable stop screws for limiting their movement under the action of the spring and are adapted to adjust the magnets 77 so that the brake shoes of both magnets will be the same distance from the disk 76 when the magnets are retracted to release the brake.

The automatic switch for controlling the different circuits comprises a box 80 of non-conducting material secured to the frame 10 within the drum 11, and which is provided with suitable binding posts which are interconnected with each other within the box and with the different elements therein.

81 is a support mounted within the switch box 80, and pivotally connected to the support are two sets of parallel levers 82, 82 and 82ª, 82ª. The levers 82 of one set are connected to each other by a link 83, while the levers 82ª are connected to each other by means of a similar link 83ª. 84 and 84ª are cross bars connected to the links 83 and 83ª respectively. 85 and 85ª are springs connected to the respective parallel lever mechanism to normally move and retain the lever mechanism in their retracted positions, and 86 and 86ª are electro-magnets for shifting the respective parallel lever mechanism against the actions of the springs by attracting the lower parallel levers or armatures 82 and 82ª.

Connected to the cross bar 84, but insulated therefrom, are switch members 87, 88 and 89, and connected to the cross bar 84ª are similar switch members 87ª, 88ª and 89ª, each of which switch members is arranged to close the circuit through two contacts as hereinafter described.

90, 91, 92, 93, 94, 95, 96, 97, 98, 99, 100 and 101 are contacts arranged in pairs and through which circuits are arranged to be closed by the switch members on the cross bars 84 and 84ª.

102, 103, 104, 105, 106, 107, 108, 109, 110, 111, 112 and 113 are binding posts on the switch box interconnected with each other and the contacts 91 to 101, which extend to the exterior thereof and are adapted to be electrically connected with the various electrically actuated devices of the system controlled by the automatic switch.

114 is a source of electrical energy, such as a battery, the positive pole of which is connected to binding post 103 through a hand switch 115 in said connection, while the other or negative side of the battery is connected to the binding post 102.

116, 117, 118 and 119 are binding posts within the switch box 80, the terminals of the windings of magnet 86$^a$ are connected to the bindings posts 116 and 117, while the terminals of the windings of magnet 86 are connected to the binding posts 118 and 119.

The binding post 103 connected to the positive pole of the source of electrical energy is also connected to the binding posts 106, 108, 116 and 118 by connections 120, while the binding post 102 which is connected to the negative pole of the source of energy is also connected to binding posts 107, 111 and 113 by a connection 121. The binding posts 104 and 105 are connected to binding posts 119 and 117 by wires 122 and 123 respectively. Binding posts 104 and 105 are also connected to brushes 68 and 69 respectively, while binding post 107 is connected to ground. Binding post 106 is connected to one side of motor 124 on shaft 33 for driving the drum 11 and the sprocket wheel 14, while the other side of said motor is connected to ground, or the negative pole of the source of electrical energy.

The brushes of the motor 70 for rocking the walking beam 39 are connected to binding posts 109$^a$ and 110$^a$ which are in turn connected to binding posts 109 and 110 respectively, while the terminals of the field windings of motor 70 are connected to binding posts 108$^a$ and 111$^a$, which are connected to binding posts 108 and 111 respectively. 112$^a$ and 113$^a$ are binding posts connected to the coils of the braking magnets 77 and are also connected to the binding posts 112 and 113 respectively. The binding post 106 is also connected to one side of the winding of the clutch magnet 63 through the bush 65 and ring 64, while the other side thereof is connected to ground.

Contacts 90, 96 and 98 are connected to the positive wire 120 within the automatic switch box, while contacts 94 and 100 are connected to the negative wire 121 in said box. Contacts 91 and 92 are interconnected, and contact 93 is connected to binding posts 112. Contacts 95 and 99 are connected to binding posts 109 and contacts 97 and 101 are connected to binding post 110.

In the operation of the device, the film is placed as hereinbefore described and the hand switch 115 is closed, which will close the various circuits. This closing of the different circuits will energize the magnet 63 and draw the driving disk 59 into driving relation with the driven disk 60, and as the motor 124 is rotated by the closing of the circuits, all of the film driving and synchronizing devices will be set into motion. Assuming that the length of the film is eleven and seven-eighth inches for each sixteen pictures and all of the various parts are in their positions for a film of this length, the various elements will be in the positions shown in Figs. 2 and 3, with the exception of the switch 115 which is closed. As long as this film length is maintained, the circuit to the brake magnets 77 will remain closed and the circuit to the armature of motor 70 for rocking the walking beam will be open and at which time the sprocket wheel 14 will be rotated at a speed of sixteen pictures per second and the measuring wheel 19 at a lineal speed of eleven and seven-eighths inches per second. If the film length should now slightly decrease, the speed of the measuring wheel 19 would necessarily be accordingly decreased together with the speed of the driven disk 60, and as the speed of gear wheel 49 is constant, finger 73 which is carried by the hub of wheel 49 will move into engagement with contact 71 and close the circuit through magnet 86. This closing of the circuit through magnet 86 will draw down the armature or cross bar 84, break the circuit to the brake magnets 77 and free the shaft of motor 70, and at the same time close the circuit through the motor 70 to rotate it sufficiently to shift the walking beam 39 to move the driving disk 59 outwardly on the driven disk 60 and increase the speed of the driven disk in direct proportion to the decrease in size of the film. As soon as disk 60 has speeded up the circuit will be broken to magnet 86 between finger 73 and contact 71. This breaking of the circuit to magnet 86 will permit the armature or cross bar 84 to be raised by its spring 85, which will break the circuit to motor 70, close the circuit to the brake magnets 77 and arrest the movement of the shaft of motor 70.

This shifting of the walking beam 39 will not only change the ratio between the driving disk 59 and driven disk 60, but it will also shift the cam frame 42 and cam 44 to shift the lenses 28 and 29 of the projecting lens the proper distance to increase the magnification in proportion to the decrease in the size of the pictures on the film and thereby maintain the size of the picture projected through the compensating lens system constant. If the film length should now increase, the speed of driven disk 60 will be greater than the gear wheel 49 which will close the circuit through magnet 86ᵃ when finger 73 carried by the gear wheel 49 engages the contact 72, which will cause the motor 70 to rotate slightly to rock the walking beam 39 to reduce the speed of driven disk 60 and shift lens members 28 and 29 in accordance with the increase in size of the pictures on the film.

It will, therefore, be seen that as the film length varies, the lenses 28 and 29 will instantly be adjusted to vary the magnification of the pictures on the film in accordance with the variations in the size of said pictures to maintain a constant size of picture projected through the compensating lenses as well as the picture on the screen to and thereby avoid flicker.

In the foregoing I have merely described a cam 44 for shifting the lenses 28 and 29 of the projecting lens, having shaped surfaces on opposite faces for shifting the lenses in a machine which is spaced a given distance from the screen, and if it is desired to place the machine at a different distance from the screen than that which the cam shown is designed for, it will be necessary to provide a properly shaped cam 44.

I prefer, however, to equip the machines with an adjustable cam, such as shown in Figs. 13 and 14, which is adapted to adjust the lenses 28 and 29 of a given focal length with relation to each other to project the picture on screens at varying distances within predetermined limits.

In the form shown, the cam 44ᵃ is an irregular frustum of a cone, the surface on one side being cut to adjust the lens carrier for lens 28, while the surface on the opposite face is cut to adjust the lens carrier for lense 29.

The surfaces are so cut that when the cam 44ᵃ is in any position the lenses 28 and 29 will be properly adjusted relative to each other to focus the picture on a screen at a predetermined distance from the projecting lens.

This cam 44ᵃ is turnably mounted on a stem 125 extending upwardly from a graduated base 126 on the cam block 43ᵃ. 127 is a nut for securing the cam to the base block 126, and 128 is a jam nut for locking the nut 128 against movement.

When the machine is set up in the theatre, the cam 44ᵃ is rotated to focus the picture on the screen and is then secured in its adjusted position on the frame by the nuts 127 and 128, and the screws 45 and 46, and is adapted to be adjusted by the movement of the walking beam 39 in the same manner as the cam 44 to compensate for the variations in the sizes of the pictures.

Each of the lenses 28 and 29 of the projecting lens is mounted in a frame 129 which is seated in a receiving recess in its supporting frame, and is provided with a handle 130 for removing and replacing the frame.

As the lens 29 in the form shown is made up of two elements with an intervening space between the members, I prefer to mount each member of this lens in a separate frame so that both faces of the two members can readily be cleaned, while the lens 28, which is also made up of two members the adjacent faces of which are cemented to each other, is supported in a single frame 129. The adjacent faces of the two frames 129 for the lens members 29 engage each other, while the forward face of the one frame is seated against the wall of the receiving recess, and 131 are leaf springs, there being one in each side of the recess, which engage the rear face of the other frame and retain both of said frames against longitudinal movement. 132 are leaf springs in one side of the recess for the frames of the lens members of lens 29, there being one for each frame, and which are arranged to retain the frames against the opposite wall of the recess and also yieldingly hold said frames against lateral movement.

The frame 129 for lens 28 is similarly retained in its recess by means of springs 131 and 132.

This arrangement of frames and retaining springs provides means for permitting the lenses to be readily removed for cleaning and accurately replaced without changing the adjustment.

In the foregoing I have merely described one type of electrically controlled apparatus embodying my invention, but it will readily be understood that my invention may be carried out by means of other forms of electrically controlled and actuated devices, as well as with devices actuated and controlled by other means.

The advantages of my invention result from the provision of a method and means for continuously varying the magnification of the pictures projected from a continuously moving film, and varying the magnification thereof in the reverse proportion to the variations in the size of the pictures, and controlling said magnification by the size of the pictures on the film.

Another advantage results from the provision of means for continuously moving the film and an optical compensating device in synchronism with the successive pictures on the film, and moving a synchronizing and stabilizer wheel by the lineal travel of the film and adjusting the projecting lens by the variations in the differences in speed between the film moving means and synchronizing wheel. Also from the provision of electrically actuated devices controlled by the variations in the speeds between the film feeding mechanism, and a synchronizer or measuring device actuated by the lineal speed of the film.

Having now fully described my invention, what I claim and desire to protect by Letters Patent is:

1. The method of projecting pictures comprising passing a film having successive pictures in a continuous manner between a source of light and a relatively fixed lens system, moving a compensating lens system in timed relation to the pictures on the film to compensate for the moving film, and adjusting the lens systems with relation to each other and the film during the movement of the film to compensate for variations in the size of said pictures.

2. The method of projecting pictures comprising passing a film having successive pictures in a continuous manner between a source of light and a relatively fixed lens system, moving a compensating lens system in timed relation to the pictures on the film to compensate for the moving film, and adjusting the fixed lens system with relation to the film and the movable lens systems during the movement of the film and throughout the length of its travel in proportion to the variations in the ratio between the number of pictures per given length of film and thereby vary the magnification thereof to maintain the projected picture constant in size.

3. The method of projecting moving pictures on a screen, comprising continuously moving longitudinally a film having successive pictures thereon between a source of light and a lens system fixed with relation to the continuous movement of the film, and moving the film at a substantially constant lineal speed, moving a compensating lens system in timed relation to the movement of the successive pictures through which the light passes from the fixed lens system to compensate for the movement of the film to cause the picture to appear stationary on the screen, and during the longitudinal movement of the film causing the variation between the lineal speed and the number of pictures per given period to vary the magnification in accordance with the variation in the size of the pictures to maintain a picture of constant size on the screen.

4. The method of projecting moving pictures on a screen, comprising continuously moving longitudinally a film having successive pictures thereon between a source of light and a lens system fixed with relation to the continuous movement of the film and moving the film at a substantially constant lineal speed, moving a compensating lens system in timed relation to the movement of the successive pictures through which the light passes from the fixed lens system to compensate for the movement of the film to cause the picture to appear stationary on the screen, and during the longitudinal movement of the film causing the variation between the lineal speed and the number of pictures per given period to adjust the fixed lens system with relation to the film and the compensating lens system to maintain a picture of constant size on the screen by varying the magnification in accordance with the variations in the sizes of the pictures passing between the source of light and the fixed lens system.

5. The method of projecting pictures to maintain the image on the screen substantially constant in size regardless of variations in the size of the pictures on the film in a continuous manner, comprising moving the film between a source of light and a magnifying medium, and a medium for compensating for the movement of the film and varying the magnifying medium in accordance with the variations in the sizes of the pictures on the film as such variations occur.

6. The method of projecting pictures to maintain the image on the screen substantially constant in size regardless of variations in the size of the pictures on the film, comprising continuously moving the film between a source of light and a magnifying medium and a medium for compensating for the movement of the film, counting the pictures and measuring the length of the film during its movement to ascertain the variations in the lengths of the pictures, and varying the magnification in accordance with the variations in size.

7. The method of projecting pictures to maintain the image on the screen substantially constant, comprising continuously moving a film and an optical compensating system, projecting beams of light between the film and the optical compensating system through an objective lens system and varying the effect of said objective lens system in accordance with the variations in the length of the film picture sections to correct optically the variations in the sizes of the picture sections on the film.

In testimony of which invention, I have hereunto set my hand, at Philadelphia, Pa., on this first day of March, 1921.

SAMUEL BARDY.